(No Model.)
J. T. DYSART.
OXYHYDROCARBON HEAT AND FUEL ECONOMIZING APPARATUS.
No. 315,489. Patented Apr. 14, 1885.
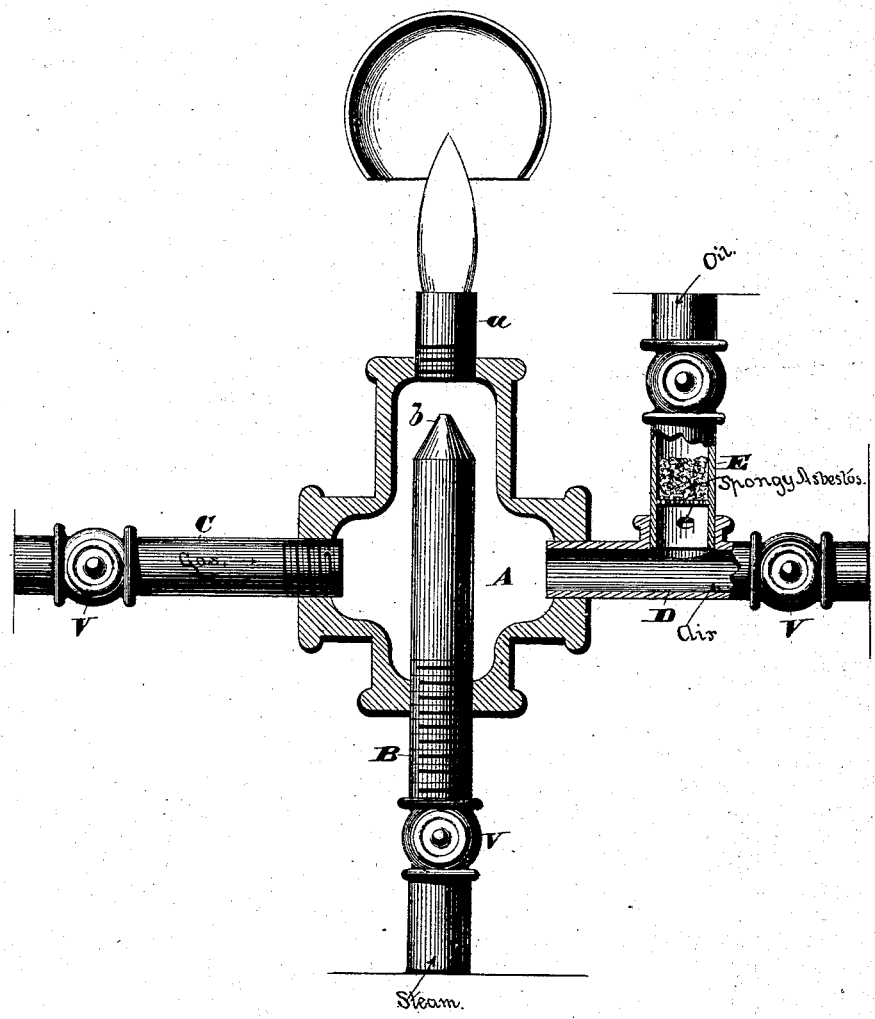

UNITED STATES PATENT OFFICE.

JOHN T. DYSART, OF SHIPPENSVILLE, PENNSYLVANIA.

OXYHYDROCARBON HEAT AND FUEL ECONOMIZING APPARATUS.

SPECIFICATION forming part of Letters Patent No. 315,489, dated April 14, 1885.

Application filed February 9, 1884. Renewed March 11, 1885. (No model.)

*To all whom it may concern:*

Be it known that I, JOHN T. DYSART, of Shippensville, in the county of Clarion and State of Pennsylvania, have invented certain new and useful Improvements in Oxyhydrocarbon Heat and Fuel Economizing Apparatus; and I do hereby declare the following to be a full, clear, and exact description of the invention, such as will enable others skilled in the art to which it appertains to make and use the same.

My invention relates to an improvement in oxyhydrocarbon heat and fuel economizing apparatus, the object of the same being to provide an apparatus by means of which natural hydrocarbon gas or manufactured gas, either alone or in connection with oil or other burning-fluid, may be burned in such a manner as to afford economy in heat and fuel; a further object being to provide an apparatus for burning gas or gas and oil or other burning-fluid in such a manner as to produce an even heat, require little attention, and not be liable to get out of order.

With these ends in view my invention consists in certain features of construction and combinations of parts, as will be fully described, and pointed out in the claims.

The accompanying drawing is a sectional view of the entire apparatus.

A represents a chamber, of any approved form or construction, provided with the burner-tube $a$. A steam-jet pipe, B, enters the chamber A, and terminates in a nipple or contracting end, $b$, in a position a short distance from and opposite the center of the tube $a$.

On one side of the pipe B the pipe C enters the chamber A, and is adapted to conduct gas into the said chamber. On the opposite side of the chamber A from the pipe C the pipe D enters the chamber, and is adapted to admit air to the chamber as desired. At a position a short distance from the chamber A the oil-supply pipe E connects from above with the pipe D. The pipe E is provided with a perforated plate, $e$, near its connection with the pipe D.

Upon the perforated plate $e$ a quantity of spongy asbestus or other suitable absorbing material is placed.

The several pipes are provided with valves V, for the purpose of regulating the flow of the several gases or liquids.

The apparatus operates in the following manner: The gas and air are drawn into the chamber A and forced out of the burner-tube $a$, in such proportions and with such force as may be desired, by means of the steam issuing from the nipple $b$ tending to form a vacuum in the said chamber. The oil or burning-fluid from the pipe E is held in partial suspension by the absorbing material on the plate $e$, and is thereby equally distributed over the plate and falls therefrom in drops into the air-pipe D. From thence it is carried with the current of air through the pipe D into the chamber A and burner-tube $a$. During the progress of the oil or burning-fluid from the pipe E to the burning-tube $a$ it becomes vaporized and thoroughly commingled with the air, gas, and steam.

It will be readily seen from the above description that I have produced a simple and very effective means of obtaining the perfect combustion of the several elements which may be used, and that by the simple adjusting of the several valves I am able to maintain an even amount of heat for purposes of generating steam or any purpose desired.

I am aware that apparatuses have been constructed for the purpose of supporting a flame by mingling oil, gas, and steam; but I am not aware that an apparatus embodying the principles and important features of construction herein set forth has hitherto been produced.

It is evident that the construction and relative positions of the several parts described may be somewhat changed without departing from the spirit and scope of my invention; hence I do not wish to be understood as limiting myself strictly to the construction as herein set forth.

Having fully described my invention, what I claim as new, and desire to secure by Letters Patent, is—

1. The combination, with a vacuum-chamber provided with a burner-tube and having pipes connected therewith admitting gas, air, and oil or burning-fluid, of a steam-jet constructed to draw gas, air, and oil or burning-fluid into the chamber and force the same through the burner-tube, substantially as set forth.

2. The combination, with a vacuum-chamber provided with a burner-tube, gas and air supply pipes, and a steam-jet constructed to produce a partial vacuum in the said chamber, of an oil or burning-fluid supply pipe provided with a perforated plate supporting spongy asbestus or other absorbing material for the purpose, substantially as set forth.

3. The combination, with a vacuum-chamber and air-supply pipe, of an oil or burning-fluid supply pipe entering the said air-supply pipe, and provided with a bed of asbestus or other absorbent, and a steam-jet pipe constructed to produce a partial vacuum in the chamber, and thereby feed the oil or burning-fluid to a flame, substantially as set forth.

4. An apparatus for the more perfect combustion of gas, or gas and oil or burning-fluid, consisting of a vacuum-chamber provided with a burner-tube, a gas-supply pipe connected with the chamber, an air-supply pipe connected with the chamber, a steam-jet pipe passing within the chamber, an oil or burning-fluid supply pipe provided with a perforated plate supporting a bed of asbestus or other absorbent, and regulating-valves, the whole constructed and arranged in the manner substantially as set forth.

In testimony whereof I have signed this specification in the presence of two subscribing witnesses.

JOHN T. DYSART.

Witnesses:
G. W. MARSHALL,
JACOB BRENNEMAN.